United States Patent
Kimura et al.

(10) Patent No.: US 9,584,053 B2
(45) Date of Patent: Feb. 28, 2017

(54) VEHICLE CONTROL SYSTEM

(71) Applicant: DENSO CORPORATION, Kariya, Aichi-pref. (JP)

(72) Inventors: Kiyoshi Kimura, Kariya (JP); Jun Yamada, Nagoya (JP); Masaaki Shinojima, Chiryu (JP)

(73) Assignee: DENSO CORPORATION, Kariya (JP)

( * ) Notice: Subject to any disclaimer, the term of this patent is extended or adjusted under 35 U.S.C. 154(b) by 108 days.

(21) Appl. No.: 14/336,607

(22) Filed: Jul. 21, 2014

(65) Prior Publication Data

US 2015/0035463 A1 Feb. 5, 2015

(30) Foreign Application Priority Data

Aug. 2, 2013 (JP) .................. 2013-161409

(51) Int. Cl.
| | | |
|---|---|---|
| H02H 7/08 | (2006.01) | |
| G05D 1/00 | (2006.01) | |
| H02P 6/24 | (2006.01) | |
| B60T 1/06 | (2006.01) | |
| B60T 13/58 | (2006.01) | |
| F16D 63/00 | (2006.01) | |

(52) U.S. Cl.
CPC .............. *H02P 6/24* (2013.01); *B60T 1/062* (2013.01); *B60T 13/586* (2013.01); *F16D 63/002* (2013.01)

(58) Field of Classification Search
CPC .......... H02P 6/24; B60T 1/062; B60T 13/586; F16D 63/002; B60W 10/06
USPC ....................... 318/400.21; 701/48
See application file for complete search history.

(56) References Cited

U.S. PATENT DOCUMENTS

2006/0271260 A1* 11/2006 Matsuzaki ............ B60W 10/06
701/48

FOREIGN PATENT DOCUMENTS

| JP | 2005-337285 | 12/2005 |
| JP | 2005337285 A | * 12/2005 |
| JP | 2006-336680 | 12/2006 |

OTHER PUBLICATIONS

U.S. Appl. No. 14/265,452, filed Apr. 30, 2014, Kazuhiro Yoshida et al.
Office Action (2 pages) dated May 7, 2015, issued in corresponding Japanese Application No. 2013-161409 and English translation (2 pages).

* cited by examiner

*Primary Examiner* — Bentsu Ro
*Assistant Examiner* — Zemenay Truneh
(74) *Attorney, Agent, or Firm* — Nixon & Vanderhye P.C.

(57) ABSTRACT

A SBW-ECU prohibits driving of an electric motor by turning off power supply to the motor by a drive prohibition device, when a diagnosis part of a by-wire control circuit determines that a shift-by-wire system is abnormal or a monitor circuit determines that the by-wire control circuit is abnormal. In this case, the motor is stopped from rotating by execution of power supply phase fixation processing, by which a power supply phase of the motor is fixed without switchover, when the motor is driven to rotate at the time of determination of abnormality of the shift-by-wire system. Then the prohibition device prohibits driving of the motor by stopping the power supply to the motor.

10 Claims, 6 Drawing Sheets

VEHICLE CONTROL SYSTEM

CROSS REFERENCE TO RELATED APPLICATION

This application is based on and incorporates herein by reference Japanese patent application No. 2013-161409 filed on Aug. 2, 2013.

FIELD

The present disclosure relates to a vehicle control system having a by-wire system, which controls by a by-wire control circuit a synchronous motor provided as a drive power source for a device mounted on a vehicle.

BACKGROUND

In recent years, for meeting demands for saving space, simplifying assembling work, improving control performance and the like, more and more mechanical drive systems are replaced with by-wire systems, which are driven by electric motors.

In a by-wire system disclosed in JP-A-2006-336691 (US 2006/0271260 A1), a monitor control circuit such as an engine control circuit is provided separately from a by-wire control circuit, which controls a motor provided as a drive power source. This monitor control circuit monitors the by-wire control system based on predetermined monitor information. When the monitor control circuit detects abnormality of the by-wire system, it prohibits the by-wire control circuit from controlling the motor by, for example, prohibiting power supply to the motor by turning off a switch device.

According to this technology, the power supply to the motor is prohibited by turning off the switch device when the abnormality of the by-wire system is detected. In this case, even when the power supply to the motor is shut down under a state that the motor is in rotation, the motor is likely to continue to rotate by inertia of the motor or the like. As a result, it is not possible to stop quickly the mechanical operation of the by-wire system at the time of the abnormality of the by-wire system. It is thus likely that safety of the by-wire system cannot be ensured at the time of occurrence of abnormality.

SUMMARY

It is therefore an object to provide a vehicle control system, which can improve safety of a by-wire system at time of occurrence of abnormality.

According to one aspect, a vehicle control system comprises a by-wire system and an abnormal-time drive prohibition part. The by-wire system has a by-wire control circuit, which controls a motor provided as a drive source of a vehicle-mounted device. The abnormal-time drive prohibition part prohibits driving of the motor when the by-wire system is determined to be abnormal by monitoring the by-wire system. The abnormal-time prohibition part stops power supply to the motor after executing power supply phase fixation processing without switchover of power supply phase of the motor, when the by-wire system is determined to be abnormal. In the power supply phase fixation processing, the power supply is continued to only the fixed phase to electrically brake the rotation of the motor thereby to quickly reduce rotation of the motor.

EMBODIMENT

Figure 1:
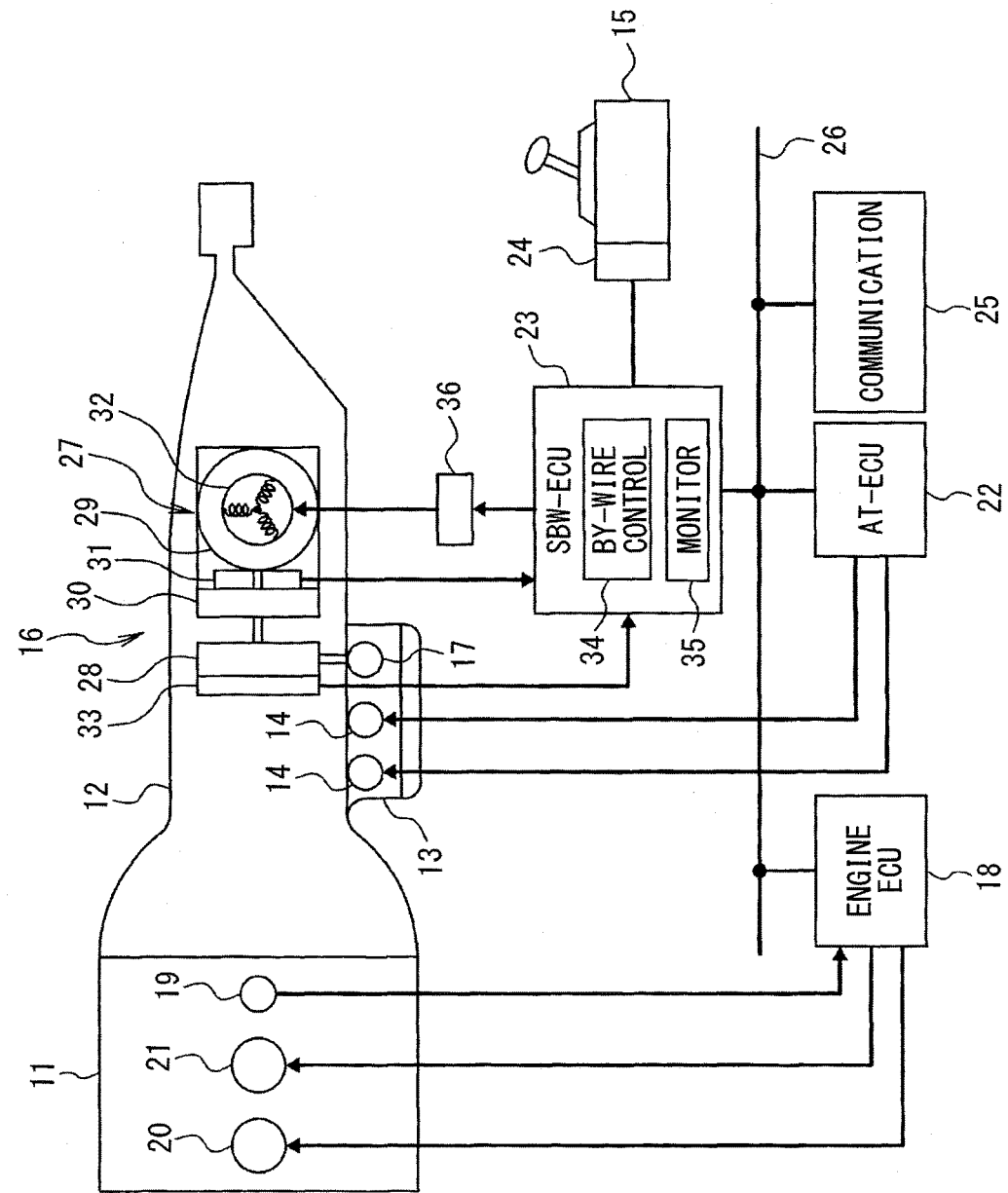
FIG. 1 is a schematic diagram showing an automatic transmission control system according to a first embodiment.

A vehicle control system will be described below with reference to various embodiments.

First Embodiment

A first embodiment will be described with reference to FIG. 1 to FIG. 5. First, a schematic configuration of an automatic transmission control system for a vehicle will be described with reference to FIG. 1.

An input shaft of an automatic transmission 12 is coupled to an output shaft (crankshaft) of an engine 11. The automatic transmission 12 is provided with a speed change gear mechanism (not shown), a friction engagement device (not shown), a hydraulic pressure control unit 13 and the like. The friction engagement device switches over combinations (speed change ratios) of power transfer gear wheels among plural wheels forming the speed change gear mechanism. The hydraulic pressure control unit 13 hydraulically switches over operation states of the friction engagement device. The hydraulic pressure control unit 13 is provided with hydraulic pressure control valves 14 and a manual valve 17. The hydraulic pressure control valves 14 control hydraulic pressures supplied to friction engagement members such as clutches and brakes, which form the friction engagement device. The manual valve 17 switches over a range switchover device 16 in a linked manner with an operation of a range selector 15. The range switchover device 16 is a vehicle-mounted device.

An electronic control unit for an engine (engine ECU) 18 for controlling the engine 11 controls a throttle position (open position of a throttle valve) of a throttle device 20, a fuel injection quantity of fuel injection valves 21 and the like in accordance with output signals of an accelerator sensor 19, which detects accelerator position (operation quantity of an accelerator pedal), and the like.

An electronic control unit for an automatic transmission (AT-ECU) 22, which controls speed change operation of the automatic transmission 12, switches over gear positions of the automatic transmission 12 to a target gear position by controlling on/off operations of the hydraulic pressure control valves 14 of the hydraulic pressure control unit 13 and thereby controlling hydraulic pressures supplied to the friction engagement members.

An electronic control unit for a shift-by-wire system (SBW-ECU) 23, which controls a range switchover operation of the automatic transmission 12, switches over shift ranges of the automatic transmission 12 by controlling an actuator 27 of the range switchover device 16 based on an output signal of a selector sensor 24, which detects a range selected by the range selector 15, and thereby controlling a switchover operation of the manual valve 17 in accordance with a range switchover operation of a driver. The range switchover device 16, the SBW-ECU 23 and the like form the shift-by-wire system.

The engine ECU 18, the AT-ECU 22, the SBW-ECU 23, a communication device 25 and the like are connected one another through a communication line 26 such as an in-vehicle LAN network to transmit and receive necessary information mutually.

The range switchover device 16 is for switching over the shift range of the automatic transmission 12 to, for example, a P-range (parking range), a R-range (reverse range), a N-range (neutral range) and a D-range (drive range). The range switchover device 16 is provided with the actuator 27 for driving the manual valve 17, a conversion mechanism 28 and the like. The actuator 27 is formed of the electric motor 29, a speed reduction mechanism 30 and the like. The electric motor 29 is a synchronous motor, which has a drive part 32 formed of plural coils arranged in a rotation direction and connected one another and generates a rotary drive force on its output shaft when the drive part 32 is supplied with power (current). The speed reduction mechanism 30 increases the rotary drive force of the output shaft of the electric motor 29 and outputs the increased rotary drive force to the conversion mechanism 28 side. The conversion mechanism 28 converts the rotary drive force outputted from the speed reduction mechanism 30 to a linear drive force and drives the manual valve 17. Thus, the shift range of the automatic transmission 12 is controlled in accordance with the rotation angle of the electric motor 29.

The electric motor 29 is provided with an encoder 31 as a rotation angle sensor, which detects a rotation angle (rotation position) of a rotor of the electric motor 29. The encoder 31 is formed of, for example, a magnetic type rotary encoder, and outputs a pulse signal to the SBW-ECU 23 at every predetermined angular rotation in synchronism with the rotation of the rotor of the electric motor 29. The SBW-ECU 23 counts the pulse signal of the encoder 31 and drives the electric motor 29 to rotate by switching over the power supply phase of the electric motor 29 in a predetermined sequence in accordance with a pulse count value (encoder count value). Since the shift range of the automatic transmission 12 changes with the rotation angle of the electric motor 29 as described above, the encoder count value indirectly indicates the actual range of the automatic transmission 12.

A range sensor 33 detects an actual range based on, for example, a rotation angle of the input shaft of the conversion mechanism 28, an output shaft of the conversion mechanism 28 or a position of the manual valve 17, and outputs a detection signal as an actual range signal to the SBW-ECU 23. A selector sensor 24 detects a command value of a range selected by a driver operating the range selector 15, which is a lever type or a button type, and outputs a detection signal as a command range signal to the SBW-ECU 23.

The SBW-ECU 23 is provided with a by-wire control circuit 34 to electrically control the actuator 27, specifically the electric motor 27, which is a drive power source of the range switchover device 16. The SBW-ECU 23 is also provided with a monitor circuit 35 as a separate circuit from the by-wire control circuit 34 to monitor whether the by-wire control circuit 34 is operating normally. The by-wire control circuit 34 is formed of a microcomputer and the like. The monitor circuit 35 is formed as an IC (for example, ASIC) and the like. A drive prohibition device 36 is provided between the SBW-ECU 23 and the actuator 27 of the range switchover device 16 to prohibit driving of the actuator 27 (electric motor 29).

Figure 3:
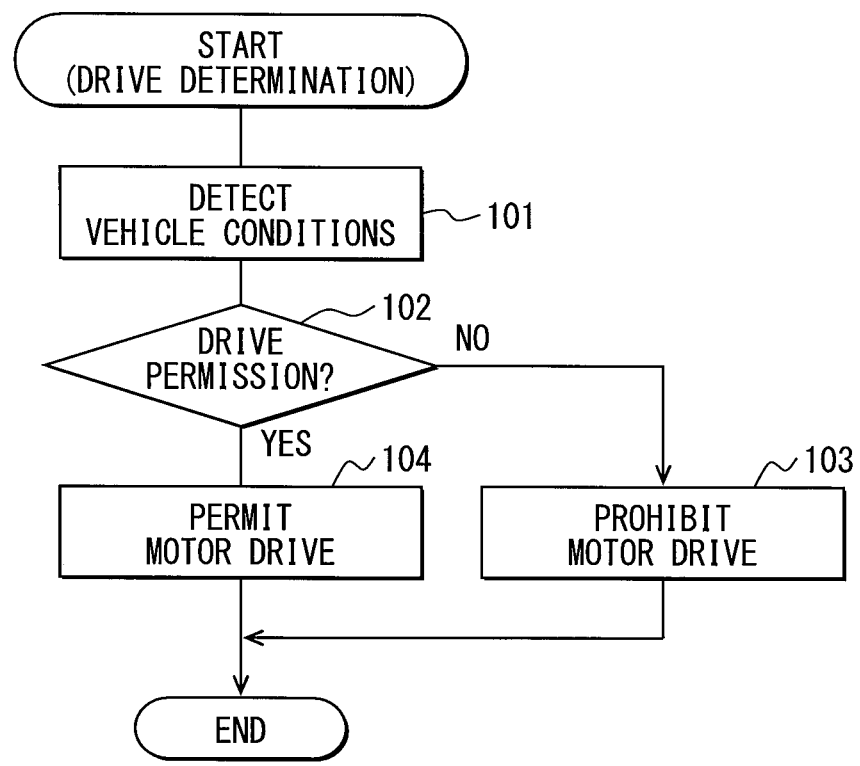
FIG. 3 is a flowchart showing processing of a drive determination routine.

The SBW-ECU 23 executes a drive determination routine shown in FIG. 3 by the by-wire control circuit 34 to determine whether the electric motor 29 is permitted to be driven or prohibited from being driven. When the electric motor 29 is not determined as being permitted to be driven, the drive prohibition device 36 prohibits the electric motor 29 from being driven.

Figure 4:
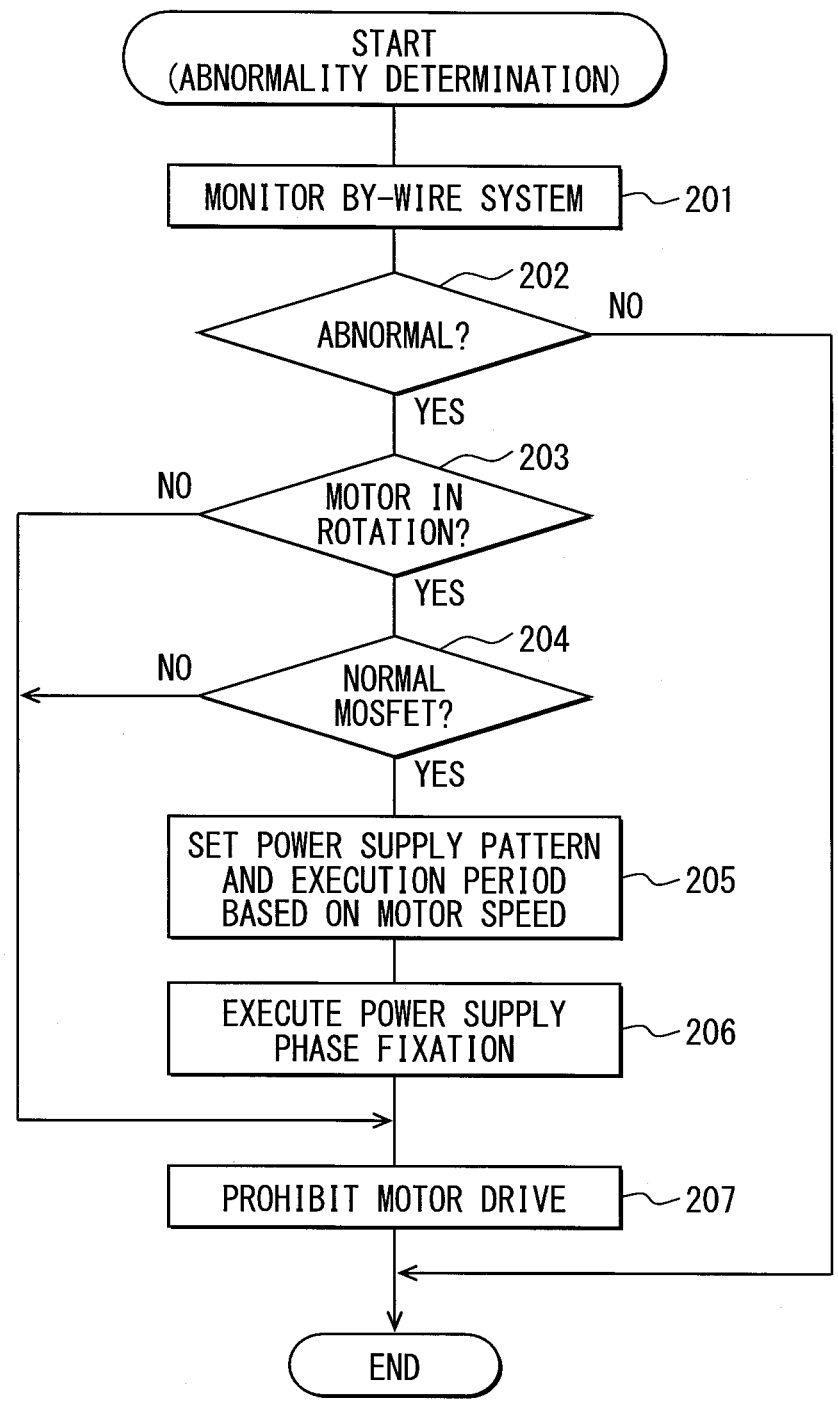
FIG. 4 is a flowchart showing processing of an abnormality determination routine.

The SBW-ECU 23 further executes an abnormality determination routine shown in FIG. 4 by the by-wire control circuit 34 to monitor whether the shift-by-wire system is operating normally. When the shift-by-wire system is determined to be abnormal, that is, the shift-by-wire system is not operating normally, the drive prohibition device 36 prohibits the electric motor 29 from being driven.

Figure 5:
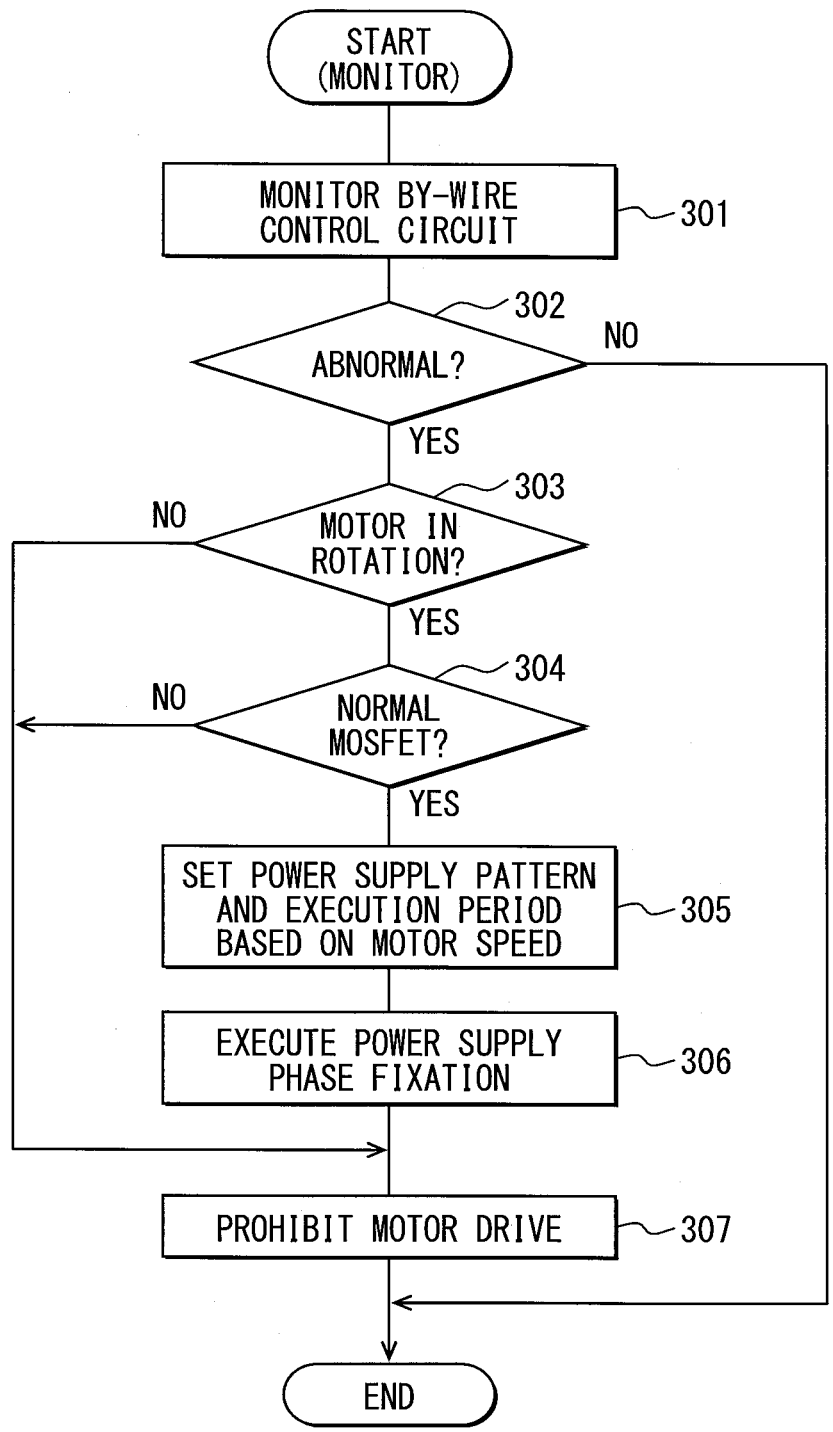
FIG. 5 is a flowchart showing processing of monitor routine.

The SBW-ECU 23 further executes a monitor routine shown in FIG. 5 by the monitor circuit 35 to monitor whether the by-wire control circuit 34 is operating normally. When the by-wire control circuit 34 is determined to be abnormal, that is, the by-wire control circuit 34 is not operating normally, the drive prohibition device 36 prohibits the electric motor 29 from being driven.

Figure 2:
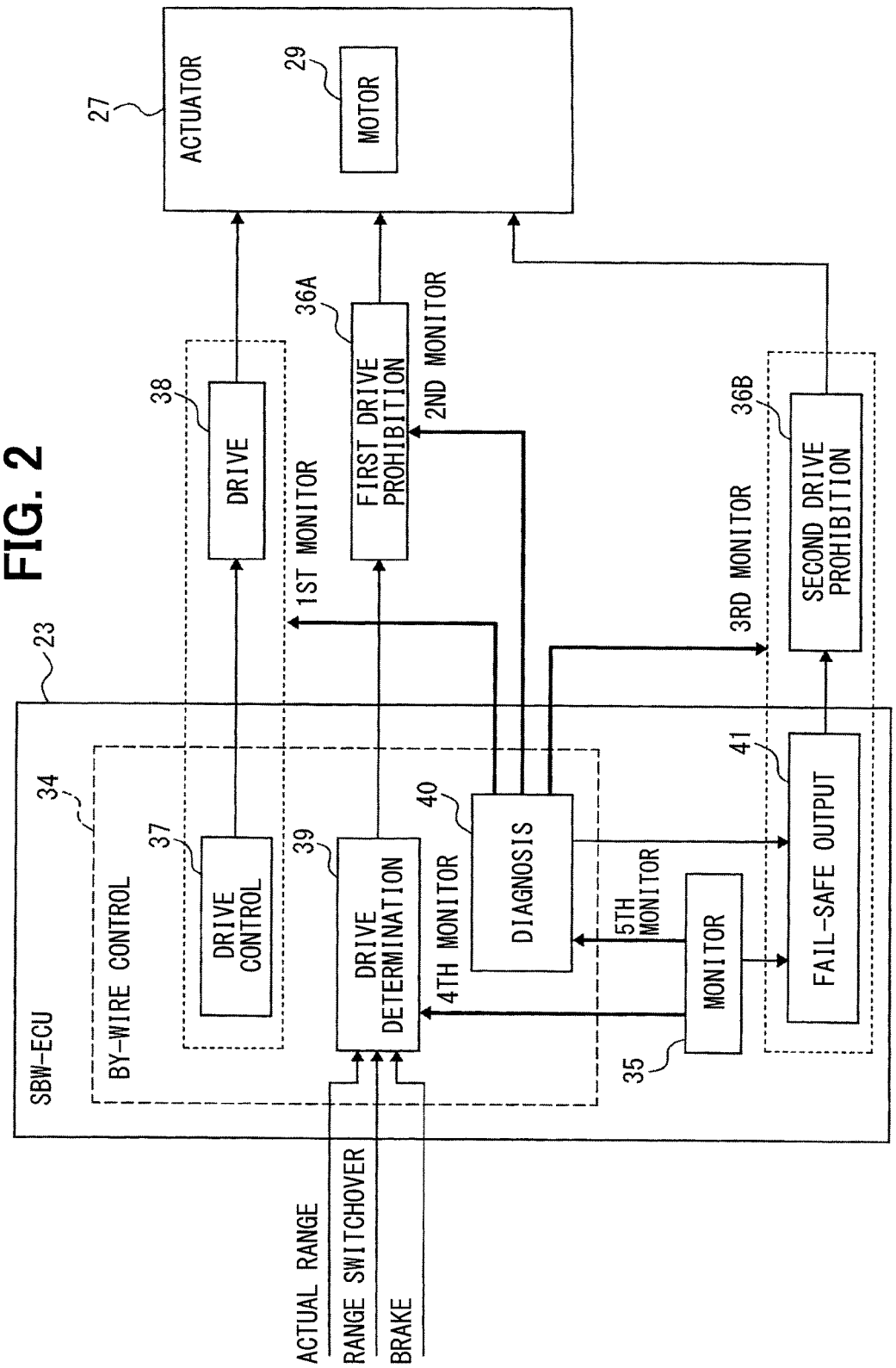
FIG. 2 is a block diagram showing schematically a motor drive prohibition function in the first embodiment.

Specifically, as shown in FIG. 2, the by-wire control circuit 34 of the SBW-ECU 23 controls the electric motor 29 by controlling a drive circuit 38, which controls the power supply to the electric motor 29, by a drive control part 37. A drive determination part 39 determines as drive determination means whether the driving of the electric motor 29 is permitted or prohibited based on plural signals indicating a vehicle state. In this case, it is determined whether, for example, the following prohibition conditions (1) to (3) are satisfied.

(1) The shift range is the P-range, that is, the actual range signal indicates the P-range.

(2) The shift range switchover request is not present, that is, the range switchover request signal is OFF.

(3) The brake is OFF, that is, the brake signal is OFF.

When all the prohibition conditions (1) to (3) are satisfied, it is determined that the electric motor 29 is prohibited from being driven. When any one of the prohibition conditions (1) to (3) is not satisfied, it is determined that the electric motor 29 is permitted to be driven.

When the drive determination part 39 determines the drive prohibition of the electric motor 29, that is, the electric motor 29 is not permitted to be driven, the electric motor 29 is prohibited from being driven by outputting the drive prohibition signal from the drive determination part 39 and prohibiting the power supply to the electric motor 29 by a first drive prohibition device 36A provided in the drive prohibition device 36.

The first drive prohibition device 36A is formed of a relay, which turns off the power supply to the electric motor 29 when the drive prohibition signal is inputted from the drive determination part 39. Thus the first drive prohibition device 36A is capable of operating even when the by-wire control circuit 34 is in failure by configuring the first drive prohibition device 36A with a hardware device (relay), which is independent from the by-wire control circuit 34.

When the drive determination part 39 determines the drive permission of the electric motor 29, the electric motor 29 is permitted to be driven, that is, the drive prohibition of the electric motor 29 by the first drive prohibition device 36A is released, by outputting the drive permission signal from the drive determination part 39.

The by-wire control circuit 34 executes first to third monitor operations by a diagnosis part 40, which operates as abnormal-time drive prohibition means. In the first monitor operation, the shift-by-wire system is determined to be abnormal, that is, the shift-by-wire system is not normal, when the drive circuit 38 is operating under a state that all the prohibition conditions (1) to (3) are satisfied, that is, driving of the electric motor 29 is prohibited.

In the second monitor operation, the shift-by-wire system is determined to be abnormal, that is, the shift-by-wire system is not normal, when a terminal voltage of the electric motor 29 is at a high level under a state that the first drive prohibition device 36A formed of the relay is commanded to turn off.

In the third monitor operation, the shift-by-wire system is determined to be abnormal, that is, the shift-by-wire system is not normal, when a terminal voltage of the electric motor 29 is at a high level under a state that a second drive prohibition device 36B formed of a relay is commanded to turn off. In the diagnosis part 40, a fail-safe output par 41 outputs a fail-safe signal when any one of the first to the third monitor operations determines that the shift-by-wire system is abnormal. The second drive prohibition device 36B provided in the drive prohibition device 36 prohibits the driving of the electric motor 29 by prohibiting the power supply to the electric motor 29.

In the diagnosis part 40, when the electric motor 29 is being driven to rotate under the determination that the shift-by-wire system is abnormal, the electric motor 29 is stopped from rotating by executing power supply phase fixation processing, in which the power supply phase of the electric motor 29 is fixed and not switched over. Then the fail-safe output part 41 outputs the fail-safe signal so that the second drive prohibition device 36B stops the power supply to the electric motor 29 for stopping the driving of the electric motor 29.

The second drive prohibition device 36B formed of the relay turns off the power supply to the electric motor 29 when the fail-safe signal is inputted from the failsafe output part 41. With the second drive prohibition device 36B being configured in the hardware device (relay) independent of the by-wire control circuit 34, the drive prohibition device 36B can operate normally even when the by-wire control circuit 34 is in failure.

The monitor circuit 35 is provided as abnormal-time drive prohibition means and provided as a separate circuit from the by-wire control circuit 34. The monitor circuit 35 executes fourth and fifth monitor operations. In the fourth monitor operation, it is determined whether the drive determination part 39 of the by-wire control circuit 34 is operating normally by executing the abnormality diagnosis about the drive determination part 39 of the by-wire control circuit 34. The diagnosis may be, for example, ROM check, RAM check, FLOW check, INST check and the like.

In the fifth monitor operations, it is determined whether the diagnosis part 40 of the by-wire control circuit 34 is operating normally by executing the abnormality diagnosis about the diagnosis part 40 of the by-wire control circuit 34. This diagnosis may also be, for example, ROM check, RAM check, FLOW check, INST check and the like.

When this monitor circuit 35 determines that the drive determination part 39 of the by-wire control circuit 34 is abnormal, that is, the drive determination part 39 is not operating normally, or the diagnosis part 40 of the by-wire control circuit 34 is abnormal, that is, the diagnosis part 40 is not operating normally, a fail-safe output circuit 41 outputs a fail-safe signal. The second drive prohibition device 36B of the drive prohibition device 36 responsively prohibits the power supply to the electric motor 29 thereby prohibiting driving of the electric motor 29.

When the electric motor 29 is being driven to rotate under a state that the by-wire control circuit 34 is determined to be abnormal, that is, at least one of the drive determination part 39 and the diagnosis part 40 of the by-wire control circuit 34 is not operating normally, the monitor circuit 35 executes the power supply phase fixation processing, by which the power supply phase of the electric motor 29 is fixed without switching over the power supply phase, so that the rotation of the electric motor 29 is stopped. Then the fail-safe output part 41 outputs the fail-safe signal and the second drive prohibition device 36B stops the power supply to the electric motor 29 thereby prohibiting driving of the electric motor 29.

The by-wire control circuit 34 of the SBW-ECU 23 executes the drive determination routine shown in FIG. 3 and the abnormality determination routine shown in FIG. 4. The monitor circuit 35 of the SBW-ECU 23 executes the monitor routine shown in FIG. 5 as described below.

Drive Determination Routine

The drive determination routine shown in FIG. 3 is repeated at a predetermined interval by the by-wire control circuit 34 while the SBW-ECU 23 is being supplied with power. When this routine is started, predetermined vehicle conditions (shift range, shift range switchover request and the brake state) are detected first at step 101 to determine whether the driving of the electric motor 29 is permitted or prohibited. In this case, it is determined for example whether the following prohibition conditions (1) to (3) are satisfied.

(1) The shift range is the P-range, that is, the actual range signal is P-range.

(2) Switchover of the shift range is not requested, that is, the range switchover request signal is OFF.

(3) The brake is not operated, that is the brake signal is OFF.

When all of the prohibition conditions (1) to (3) are satisfied, it is determined that the driving of the electric motor 29 is prohibited. When any one of the prohibition conditions (1) to (3) is not satisfied, it is determined that the driving of the electric motor 29 is permitted.

Then it is determined at step 102 whether the driving of the electric motor 29 is permitted based on a detection result of step 101. When it is determined at step 102 that the driving of the electric motor 29 is not permitted, that is, the electric motor 29 is prohibited from being driven, step 103 is executed to prohibit driving of the electric motor 29 by prohibiting the power supply to the electric motor 29 by the first drive prohibition device 36A.

When it is determined at step 102 that the driving of the electric motor 29 is permitted, that is, the electric motor 29 is permitted to be driven, step 104 is executed to permit driving of the electric motor 29, that is, the drive prohibition of the electric motor 29 by the first drive prohibition device 36A is released or canceled.

Abnormality Determination Routine

The abnormality determination routine shown in FIG. 4 is repeated at a predetermined interval by the by-wire control circuit 34 while the SBW-ECU 23 is being supplied with power. When this routine is started, the shift-by-wire system is monitored first at step 201 to determine whether the shift-by-wire system is operating normally.

In the first monitor operation, it is determined that the shift-by-wire system is abnormal when the drive circuit 38 is operating under a state that all of the prohibition conditions (1) to (3) are satisfied, that is, the driving of the electric motor 29 is being prohibited. In the second monitor operation, it is determined that the shift-by-wire system is abnormal when the terminal voltage of the electric motor 29 is at the high level under the state that the first drive prohibition device 36A is commanded to turn off the relay for stopping the power supply to the electric motor 29. In the third monitor operation, it is determined that the shift-by-wire system is abnormal when the terminal voltage of the electric motor 29 is at the high level under the state that the second drive prohibition device 36B is commanded to turn off the relay for stopping the power supply to the electric motor 29.

Then it is determined at step 202 whether the shift-by-wire system is abnormal based on the monitor result of the step 201. When it is determined at step 202 that the shift-by-wire system is normal, that is, the shift-by-wire system is operating normally in all of the first to the third monitor operations, the present routine is finished.

When it is determined at step 202 that the shift-by-wire system is abnormal, that is, any one of the first to the third monitor operations is abnormal, step 203 is executed to determine whether the electric motor 29 is being driven to rotate, that is, the electric motor 29 is in rotation.

When it is determined at step 203 that the electric motor 29 is not being driven to rotate, that is, the electric motor 29 is at rest, step 207 is executed to prohibit the driving of the electric motor 29 by prohibiting the power supply to the electric motor 29 by the second drive prohibition device 36B.

When it is determined at step 203 that the electric motor 29 is being driven to rotate, step 204 is executed to determine whether MOSFETs forming the drive circuit 38, that is, MOSFETs for controlling the power supply to the electric motor 29, are normal. The MOSFETs are switching elements, which switches over the power supply phase of the electric motor 29 for rotation.

When it is determined at step 204 that the MOSFETs are not normal (abnormal), it is determined that the power supply phase fixation processing cannot be executed. At step 207, the driving of the electric motor 29 is prohibited by prohibiting the power supply to the electric motor 29 by the second drive prohibition device 36B.

When it is determined at step 204 that the MOSFETs are normal, it is determined that the power supply phase fixation processing can be executed. At step 205, the power supply pattern and the execution period of the power supply phase fixation processing in accordance with the rotation speed of the electric motor 29 at that time, that is, before the power supply.

Generally, electric power required to stop rotation of the electric motor 29 by the power supply phase fixation processing increases as the rotation speed of the electric motor 29 before the power supply phase fixation processing is higher. In consideration of this relation, according to the first embodiment, the execution period of the power supply phase fixation processing, that is, the period of fixing the power supply phase, is set longer as the rotation speed of the electric motor 29 is higher.

Further, the power supply pattern is set such that the number of power supply phases is increased as the rotation speed of the electric motor 29 is higher. For example, for the electric motor 29 having three phases, the power supply pattern is set to a one-phase power supply pattern, that is, only predetermined one of phases of the electric motor 29 is supplied with power, when the rotation speed of the electric motor 29 is in a low rotation speed range. The power supply pattern is set to a two-phase power supply pattern, that is, predetermined two phases of the electric motor 29 are supplied with power, when the rotation speed of the electric motor 29 is in an intermediate range, which is higher than the low rotation speed range. Further, the power supply pattern is set to a three-phase power supply pattern, that is, predetermined three phases of the electric motor 29 are supplied with power, when the rotation speed of the electric motor 29 is in a high rotation speed range, which is higher than the intermediate rotation speed range.

Then at step 206, the rotation of the electric motor 29 is stopped by execution of the power supply phase fixation processing, by which the power supply phases of the electric motor 29 are not switched over, based on the power supply pattern and the execution period, which are set at step 205. Then at step 207, the driving of the electric motor 29 is prohibited by stopping the power supply to the electric motor 29 by the second drive prohibition device 36B.

Monitor Routine

The monitor routine shown in FIG. 5 is repeated at a predetermined interval by the monitor circuit 35 while the SBW-ECU 23 is being supplied with power. When this routine is started, it is monitored first at step 301 whether the by-wire control circuit 34 is operating normally by executing the fourth and the fifth monitor operations.

In the fourth monitor operation, the drive determination part 39 of the by-wire control circuit 34 is monitored by executing an abnormality diagnosis about the drive determination part 39 of the by-wire control circuit 34 (for example, ROM check, RAM check, FLOW check, INST check and the like). In the fifth monitor operation, it is monitored whether the diagnosis part 40 of the by-wire control circuit 34 is operating normally by executing an abnormality diagnosis about the diagnosis part 40 of the by-wire control circuit 34 (for example, ROM check, RAM check, FLOW check, INST check and the like).

Then it is determined at step 302 whether the by-wire control circuit 34 is abnormal based on a determination result of step 301. When it is determined at step 302 that the by-wire control circuit 34 is normal, that is, both of the drive determination part 39 and the diagnosis part 40 of the by-wire control circuit 34 are operating normally, the present routine is finished.

When it is determined at step 302 that the by-wire control circuit 34 is abnormal, that is, at least either one of the drive determination part 39 and the diagnosis part 40 of the by-wire control circuit 34 is not operating normally, step 303 is executed to determine whether the electric motor 29 is being driven to rotate.

When it is determined at step 303 that the electric motor 29 is not being driven to rotate, that is, the electric motor 29 is stopped, step 307 is executed to prohibit the driving of the electric motor 29 by prohibiting the power supply to the electric motor 29 by the second drive prohibition device 36B.

When it is determined at step 303 that the electric motor 29 is being driven to rotate, step 304 is executed to determine whether the MOSFETs forming the drive circuit 38, that is, MOSFETs for controlling the power supply to the electric motor 29, is normal.

When it is determined at step 304 that the MOSFETs are not normal (abnormal), it is determined that the power supply phase fixation processing cannot be executed. In this case, step 307 is executed to prohibit the driving of the electric motor 29 by prohibiting the power supply to the electric motor 29 by the second drive prohibition device 36B.

When it is determined at step 304 that the MOSFETs are normal, it is determined that the power supply phase fixation processing can be executed. In this case, step 305 is executed to set the power supply pattern and the execution period of the power supply phase fixation processing in correspondence to the rotation speed of the electric motor 29 of the present time, which is immediately before the power supply phase fixation processing, in the similar manner as step 205 of FIG. 4.

Then at step 306 the power supply phase fixation processing, by which the power supply phase of the electric motor 29 is fixed without switchover of the power supply phase, is executed to stop the rotation of the electric motor 29 in accordance with the power supply pattern and the execution period set at step 305. Then at step 307, the driving of the electric motor 29 is prohibited by stopping the power supply to the electric motor 29 by the second drive prohibition device 36B.

According to the first embodiment described above, when the electric motor 29 is being driven to rotate under a state that the shift-by-wire system is determined to be abnormal by the diagnosis part 40 of the by-wire control circuit 34 or the by-wire control circuit 34 is determined to be abnormal by the monitor circuit 35, the rotation of the electric motor 29 can be quickly stopped by executing the power supply phase fixation processing without switchover of power supply phase of the electric motor 29. Then the driving of the electric motor 29 can be prohibited by stopping the power supply to the electric motor 29 by the drive prohibition device 36, that is, the second drive prohibition device 36B. Thus, when the shift-by-wire system is abnormal, the mechanical operation of the shift-by-wire system can be stopped quickly and the safety of the shift-by-wire system at the time of abnormality of the same can be improved.

Further, according to the first embodiment, the power supply pattern and the execution period of the power supply phase fixation processing are set in accordance with the rotation speed of the electric motor 29 provided before the power supply phase fixation processing. With this setting, the power supply pattern and the execution period are varied to match the electric power, which is required to stop the rotation of the electric motor 29 by the power supply phase fixation processing and varied with the rotation speed of the electric motor 29 provided before the power supply phase fixation processing. Thus the power supply pattern and the execution period can be set to an appropriate value (power amount required to stop the rotation of the electric motor 29). As a result, it is possible to prevent the amount of power consumption required to execute the power supply phase fixation processing from increasing excessively while enabling the electric motor 29 to stop rotation quickly by the power supply phase fixation processing.

Further, according to the first embodiment, the drive determination part 39 of the by-wire control circuit 34 determines permission and prohibition of driving the electric motor 29. When it is not determined that the driving of the electric motor 29 is permitted, that is, the driving of the electric motor 29 is prohibited, the drive prohibition device 36, specifically the first drive prohibition device 36A, prohibits the driving of the electric motor 29. The monitor circuit 35 provided separately from the by-wire control circuit 34 monitors whether the by-wire control circuit 34 is operating normally. When it is determined that the by-wire control circuit 34 is not operating normally, the drive prohibition device 36, specifically the second drive prohibition device 36B, prohibits the driving of the electric motor 29.

It is thus possible to maintain the electric motor 29 in the drive-prohibited state until the drive determination part 39 determines the permission of driving the electric motor 29, even when the by-wire control circuit 34 is normal. It is also possible to prohibit the driving of the electric motor 29 when the monitor circuit 35 determines that the by-wire control circuit 34 is not operating normally, even when the drive determination part 39 determines the permission of the electric motor 29. As described above, the driving of the electric motor 29 can be prohibited by both of the by-wire control circuit 34 (drive determination part 39) and the monitor circuit 35. The shift range is prevented from switching over unintentionally at the time of occurrence of abnormality of the system, for example, at the time of development of abnormal signal due to noise or power voltage drop, and the safety is enhanced.

Further, according to the first embodiment, the permission and the prohibition of driving the electric motor 29 are determined based on the plural signals, for example, actual range signal, range switchover request signal and brake signal. As a result, it is possible to determine the drive permission and the drive prohibition of the electric motor 29 with redundancy and it is not necessary to provide redundant design, for example dual systems, for each signal.

Further, according to the first embodiment, the drive prohibition device 36 (first and second drive prohibition devices 36A and 36B) is configured with the hardware device such as the relay separately from the by-wire control circuit 34 so that the drive prohibition device 36 can operate normally even when the by-wire control circuit 34 fails. As a result, the driving of the electric motor 29 can be prohibited by operating normally the drive prohibition device 36 even when the by-wire control circuit 34 fails.

Further, according to the first embodiment, the by-wire control circuit 34 of the SBW-ECU 23 is provided with the function of the drive determination part 39. As a result, it is not necessary to change the specification of a control circuit (for example, control circuit for the engine ECU 18 and control circuit for the AT-ECU 22), which is separate from the by-wire control circuit 34, and it is necessary to change only the specification of the by-wire control circuit 34.

Second Embodiment

A second embodiment will be described with reference to FIG. 6. Substantially the same parts as in the first embodiment are designated with the same reference numerals to simplify the description and only different parts will be described below.

Figure 6:
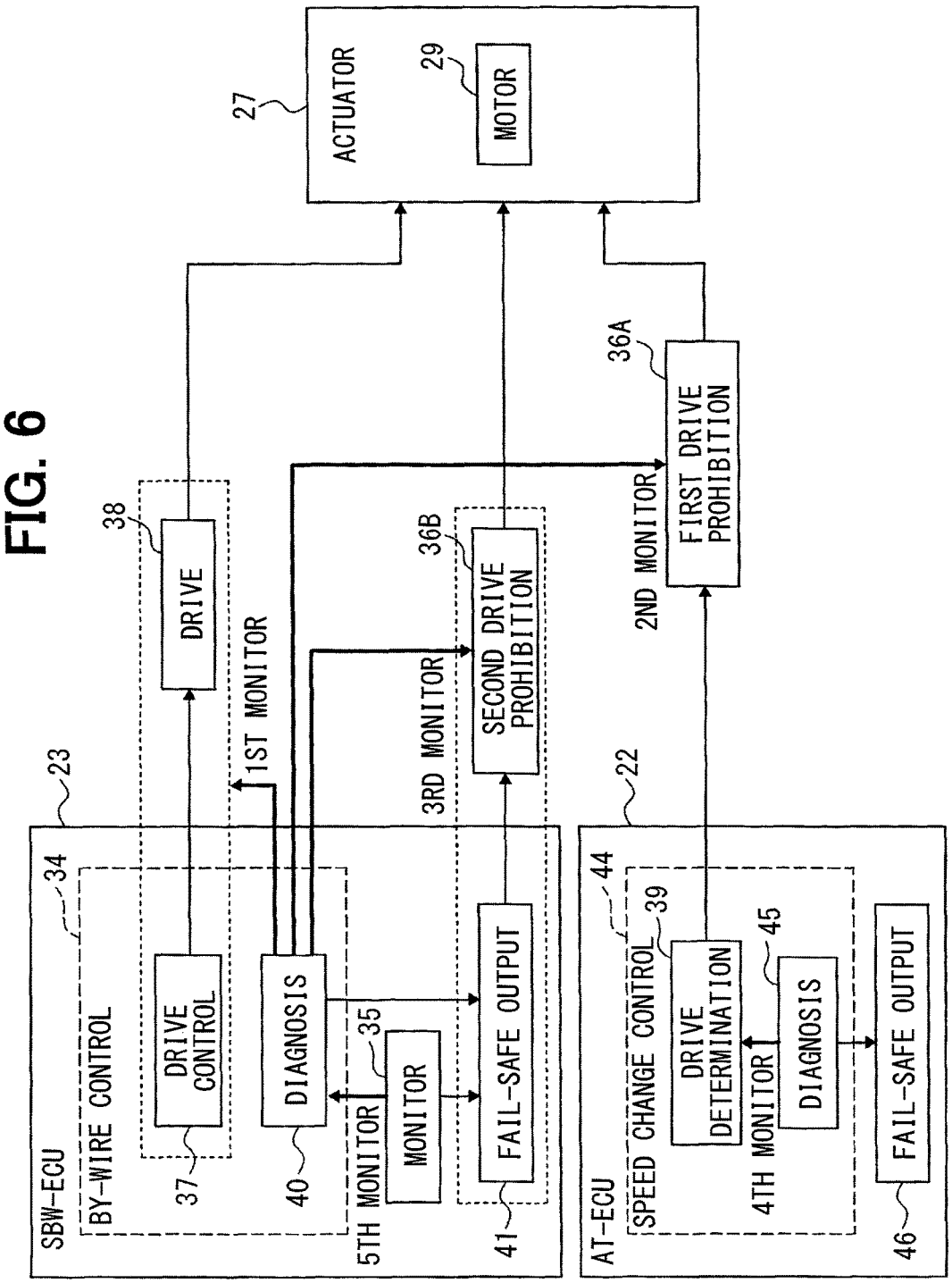
FIG. 6 is a block diagram showing schematically a motor drive prohibition function according to a second embodiment.

According to the second embodiment, as shown in FIG. 6, a control circuit, which is different from the by-wire control circuit 34 of the SBW-ECU 23, is configured to have a function of a drive determination part 39. Specifically, a speed change control circuit 44 of the AT-ECU 22 is provided with the function of the drive determination part 39. The speed change control circuit 44 of the AT-ECU 22 determines the permission and prohibition of driving the electric motor 29 by the drive determination part 39. When it is determined that the driving of the electric motor 29 is prohibited, that is, the driving of the electric motor 29 is not permitted, the driving of the electric motor 29 is prohibited by the first drive prohibition device 36A.

The speed change control circuit 44 of the AT 22 monitors the fourth monitor operation by the diagnosis part 45. In the fourth monitor operation, it is monitored whether the drive determination part 39 is operating normally by executing the abnormality diagnosis (for example, ROM check, RAM check, FLOW check and INST check) about the drive determination part of the speed change control circuit 44.

When the diagnosis part 45 determines that the drive determination part 39 of the speed change control circuit 44 is abnormal, that is, the drive determination part 39 is not operating normally, the fail-safe output part 46 outputs the failsafe signal so that the automatic transmission 12 is driven to the neutral state or the driving of the electric motor 29 is prohibited by the second drive prohibition device 36B.

According to the second embodiment described above, the control circuit, that is, the speed change control circuit 44 of the AT-ECU 22, which is separate from the by-wire control circuit 34 of the SBW-ECU 23, has the function as the drive determination part 39. As a result, even when the by-wire control circuit 34 is abnormal, the drive determination part 39 can determine the drive permission and the drive permission for the electric motor 29 thus enhancing the reliability of the drive determination part 39.

Further, in the second embodiment, the speed change control circuit 44 of the AT-ECU 22 is provided with the function of the drive determination part 39. However, without being limited to this configuration, the control circuit of the engine ECU 21 may alternatively be provided with the function of the drive determination part 39.

Further, in the first and the second embodiments, the power supply pattern and the execution period of the power supply phase fixing processing are set in accordance with the rotation speed of the electric motor 29 provided before the power supply phase fixing processing. However, without being limited to this configuration, the power supply pattern of the power supply phase fixing processing is set to a predetermined fixed power supply pattern or the execution period of the power supply phase fixing processing may be set to a predetermined fixed period.

Further, in the first and the second embodiments, the drive determination part 39 determines the drive permission and the drive prohibition for the electric motor 29 based on the actual range signal, the range switchover request signal and the brake signal. However, without being limited to this configuration, the drive determination part 39 may determine the drive permission and the drive prohibition for the electric motor 29 based on one or plural of the actual range signal, range switchover request signal, brake signal, command range signal, vehicle travel speed signal, engine rotation speed signal, sensor output signal indicating presence of a driver in a vehicle, for example, output signal of a seating sensor or door open signal.

Further, in the first and the second embodiments, the drive prohibition device 36 is formed of two devices, that is, the first drive prohibition device 36A and the second drive prohibition device 36B. However, without being limited to this configuration, the drive prohibition device 36 may be formed of only one device.

Further, in the first and the second embodiments, the vehicle control system is implemented in the shift-by-wire system, which electrically controls the range switchover device. However, without being limited to this implementation, the vehicle control system may be implemented in various by-wire systems such as a throttle-by-wire system, a steer-by-wire system, a brake-by-wire system (main brake-by-wire system or parking brake-by-wire system).

What is claimed is:

1. A vehicle control system comprising:
a by-wire system having a by-wire control circuit, which controls a motor provided as a drive source of a vehicle-mounted device; and
an abnormal-time drive prohibition part for prohibiting driving of the motor when the by-wire system is determined to be abnormal by monitoring the by-wire system,
wherein the abnormal-time prohibition part stops power supply to the motor after executing power supply phase fixation processing without switchover of power supply phase of the motor, when the motor is in rotation at the time of determination of the abnormality of the by-wire system.

2. The vehicle control system according to claim 1, wherein:
the abnormal-time drive prohibition part variably sets a power supply pattern of the power supply phase fixation processing in accordance with a rotation speed of the motor.

3. The vehicle control system according to claim 1, wherein:
the abnormal-time drive prohibition part variably sets an execution period of the power supply phase fixation processing in accordance with a rotation speed of the motor.

4. The vehicle control system according to claim 1, wherein:
the abnormal-time drive prohibition part includes a monitor circuit, which is provided as a separate circuit from the by-wire control circuit to monitor whether the by-wire control circuit is operating normally.

5. The vehicle control system according to claim 1, further comprising:
a drive determination part, which prohibits driving of the motor when the driving of the motor is not determined as being permitted by determining whether the driving of the motor is permitted or prohibited.

6. The vehicle control system according to claim 5, wherein:
the drive determination part determines whether the driving of the motor is permitted or prohibited based on plural signals indicating states of the vehicle.

7. The vehicle control system according to claim 5, wherein:
the drive determination part is provided in the by-wire control circuit.

8. The vehicle control system according to claim 5, wherein:
the drive determination part is provided in a circuit, which is separate from the by-wire control circuit.

9. The vehicle control system according to claim 1, wherein:
the abnormal-time drive prohibition part executes the power supply phase fixation processing, only when switching elements, which switches over the power supply phases of the motor, are normal.

10. The vehicle control system according to claim 1, wherein:
the abnormal-time drive prohibition part executes the power supply phase fixation processing, only when the motor is in rotation at the time of determination of abnormality of the by-wire system.

* * * * *